US008055071B2

(12) United States Patent
Matsumoto (10) Patent No.: US 8,055,071 B2
(45) Date of Patent: Nov. 8, 2011

(54) IMAGE PROCESSING APPARATUS, IMAGING APPARATUS AND RECORDING MEDIUM STORING IMAGE PROCESSING PROGRAM

(75) Inventor: Yukako Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 910 days.

(21) Appl. No.: 12/073,962

(22) Filed: Mar. 12, 2008

(65) Prior Publication Data

US 2008/0260245 A1    Oct. 23, 2008

(30) Foreign Application Priority Data

Mar. 16, 2007  (JP) ................................. 2007-068711
Mar. 10, 2008  (JP) ................................. 2008-059961

(51) Int. Cl.
*G06K 9/00* (2006.01)
*G06K 9/54* (2006.01)
(52) U.S. Cl. ...................................... 382/167; 382/254
(58) Field of Classification Search .......... 382/162–167, 382/254, 274–275, 154; 358/1.9, 3.26–3.27, 358/518–523; 345/589–604, 619, 423; 353/69
See application file for complete search history.

(56) References Cited

U.S. PATENT DOCUMENTS

| 3,637,308 | A | * | 1/1972 | Van Raalte et al. ............. 353/69 |
| 5,051,928 | A | * | 9/1991 | Gruters .......................... 345/591 |
| 6,522,778 | B1 | * | 2/2003 | Tamagawa ..................... 382/167 |
| 6,816,613 | B2 | * | 11/2004 | Tohyama et al. ............. 382/167 |
| 6,828,984 | B2 | * | 12/2004 | Samra .......................... 345/619 |
| 7,158,671 | B2 | * | 1/2007 | Yamazoe et al. ............. 382/167 |
| 7,453,459 | B2 | * | 11/2008 | Shekter ........................ 345/423 |
| 2004/0156544 | A1 | | 8/2004 | Kajihara |
| 2006/0279802 | A1 | | 12/2006 | Angal et al. |

FOREIGN PATENT DOCUMENTS

| EP | 1 087 614 A2 | 3/2001 |
| JP | A-3-52082 | 3/1991 |
| JP | A-2001-292333 | 10/2001 |

OTHER PUBLICATIONS

May 4, 2011 European Search Report in European Application No. 08250919.1

* cited by examiner

*Primary Examiner* — Ishrat I Sherali
(74) *Attorney, Agent, or Firm* — Oliff & Berridge, PLC (57) ABSTRACT

An image processing apparatus includes an image input section, an image segmenting section, a correcting section and a determining section. The image input section loads an input image data. The image segmenting section segments the image data into a main area containing an image of a main subject and a non-main area other than the main area. The correcting section corrects a color of the main area based on a color of the non-main area. The determining section determines a variance of hue of the non-main area. In the above-stated constitution, the correcting section enhances the correction of the color of the main area when the variance of hue of the non-main area is small compared to a case when the variance is large.

12 Claims, 8 Drawing Sheets

IMAGE PROCESSING APPARATUS, IMAGING APPARATUS AND RECORDING MEDIUM STORING IMAGE PROCESSING PROGRAM

CROSS-REFERENCE TO RELATED APPLICATION

This application is based upon and claims the benefit of priority from Japanese Patent Application No. 2007-068711, filed on Mar. 16, 2007, the entire contents of which are incorporated herein by reference.

BACKGROUND

1. Field

The embodiments relate to an image processing apparatus, an imaging apparatus, and an image processing program.

2. Description of the Related Art

Conventionally, an art in which a background part and a foreground part are extracted from an image data, and a color of the foreground part is corrected based on a color of the background part is known (refer to Japanese Unexamined Patent Application Publication No. 2001-292333). According to this conventional art, it is possible to suppress a psychological change accrues in the foreground color caused by a contrast with the background color (a color contrast effect) and to enhance a color reproducibility of the foreground part.

Besides, in this conventional art, it is determined whether an image is a solid image in which both the foreground color and the background color occupy large spaces or not, and a color correction is performed when the image is the solid image.

Incidentally, an accrual amount of the color contrast effect accrued psychologically varies depending on various photographing scenes. Accordingly, there has been problems such as the suppression of the color contrast effect goes short, or on the contrary, the color reproducibility is reduced because the color contrast effect is excessively suppressed, in the above-stated determination of the solid image.

SUMMARY

A proposition is to estimate strong and weak of a color contrast effect more practically, and to appropriately control a color correction of a main area.

<1> An image processing apparatus includes an image input section, an image segmenting section, a correcting section and a determining section.

The image input section loads an input image data.

The image segmenting section segments the image data into a main area containing an image of a main subject and a non-main area other than the main area.

The correcting section corrects a color of the main area based on a color of the non-main area.

The determining section determines a variance of hue of the non-main area.

In the above-stated constitution, the correcting section enhances the correction of the color of the main area when the variance of hue of the non-main area is small compared to a case when the variance is large.

<2> Another image processing apparatus includes an image input section, an image segmenting section, a correcting section, an information obtaining section and a condition determining section.

The image input section loads an input image data.

The image segmenting section segments the image data into a main area containing an image of a main subject and a non-main area other than the main area.

The correcting section corrects a color of the main area based on a color of the non-main area.

The information obtaining section obtains image obtaining conditions at a time of photographing the image data as information.

The condition determining section determines whether the image data is photographed under a photographing state in which a depth of field is shallow or not based on the image obtaining conditions.

In the above-stated constitution, the correcting section enhances the correction of the color of the main area when the depth of field is shallow at the time of photographing compared to a case when the depth of field is deep.

<3> For example, the image processing apparatus includes a corresponding memory section.

This corresponding memory section memorizes a combination of the colors of the main area and the non-main area and an accrual trend of a color contrast effect accrued at the main area caused by the combination, as a correspondence relation beforehand.

The correcting section inquires the combination of the colors of the main area and the non-main area to the corresponding memory section, determines the accrual trend of the color contrast effect, and corrects the color of the main area in a direction in which the accrual trend of the color contrast effect is negated.

<4> An imaging apparatus includes an image processing apparatus according to any one of the above-stated <1> to <3>, and an imaging section photographing a subject and generating an image data. This image processing apparatus corrects a color of the image data generated at the imaging section.

<5> An image processing program that causes a computer to function as an image processing apparatus according to any one of the above-stated <1> to <3>.

DETAILED DESCRIPTION OF THE EMBODIMENTS

Constitution of Embodiment

Figure 1:
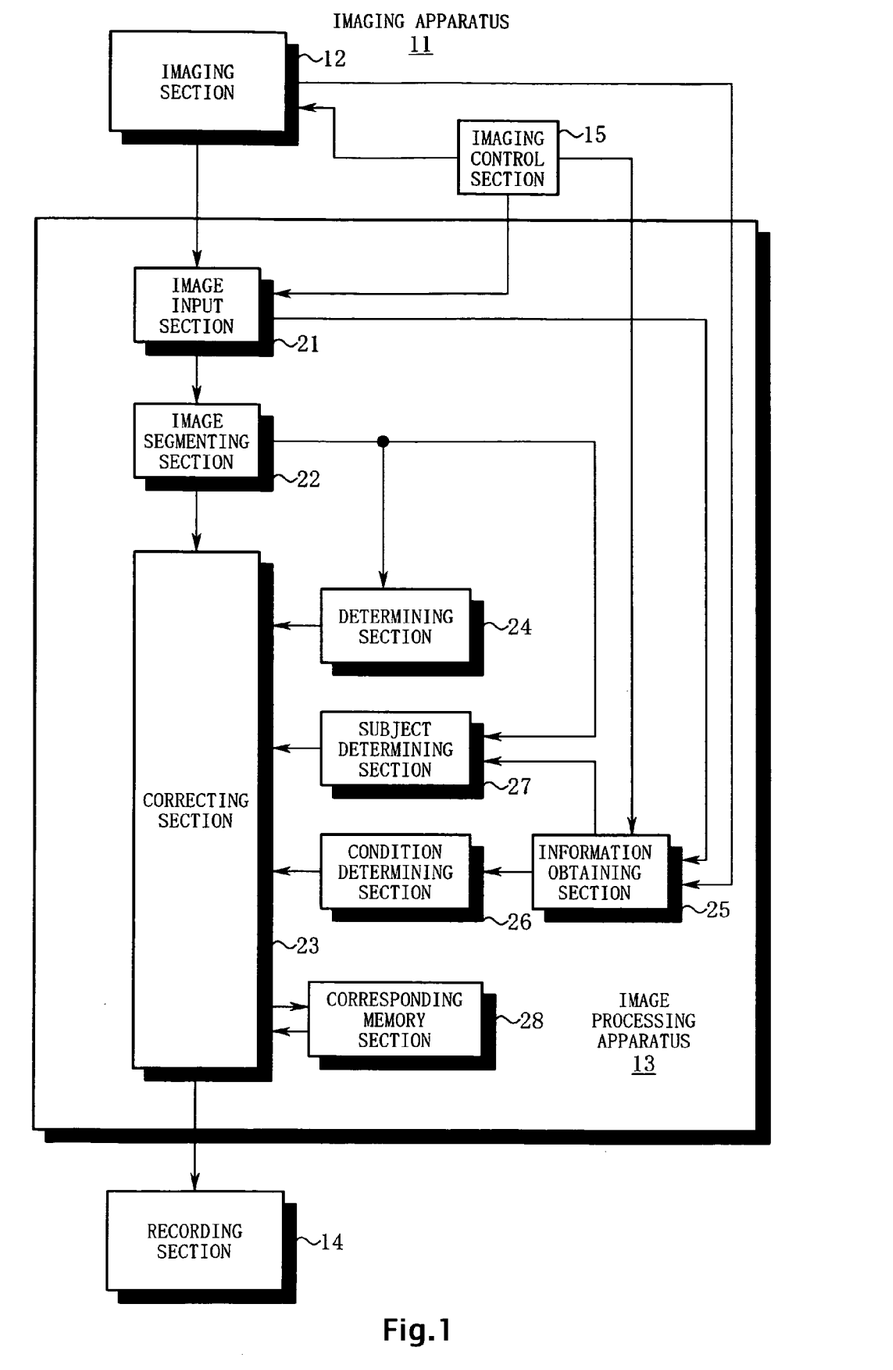
FIG. 1 is a block diagram illustrating an imaging apparatus 11 of the present embodiment.

FIG. 1 is a block diagram illustrating an imaging apparatus 11 of the present embodiment.

In FIG. 1, the imaging apparatus 11 is schematically formed by including an imaging section 12, an image processing apparatus 13, a recording section 14 and an imaging control section 15. The imaging control section 15 controls the imaging section 12, the image processing apparatus 13, the recording section 14, and so on. Besides, the imaging control section 15 performs a calculation and setting of exposure set values (shutter speed, aperture value) at a time of imaging by using subject luminance information and ISO sensitivity setting information from a not-shown photometry section, an exposure mode setting, and so on, and performs processes such as a setting of a focus detecting area of an auto-focus, an acquisition of focal length information of a not-shown imaging lens and information of a focusing optical system of the imaging lens, a calculation of focusing distance information of the imaging lens, a setting of a utilized imaging area of an image pickup device at the time of crop imaging. Incidentally, the exposure mode means well-known exposure modes such as a scene mode including a portrait mode calculating the exposure set values (shutter speed, aperture value) and so on suitable for a human photographing and a landscape mode and so on calculating the exposure set values and so on suitable for a landscape photographing, a program auto-mode suitable for a general imaging, and an aperture priority auto-mode automatically calculating the shutter speed according to the aperture value set by a user. The set values, calculated values, detected values and so on processed at the imaging control section 15 can be output to a later-described information obtaining section 25 and so on. This image processing apparatus 13 has a constitution as stated below.

(1) An image input section 21 that loads an image data output from the imaging section 12 and so on.
(2) An image segmenting section 22 that detects a main subject, and segments the image data into a main area containing an image of the main subject and a non-main area other than the main area.
(3) A correcting section 23 that corrects a color of the main area based on a color of the non-main area.
(4) A determining section 24 that determines a variance of hue of the non-main area.
(5) The information obtaining section 25 that obtains image obtaining conditions when the image data is photographed, as information.
(6) A condition determining section 26 that determines a depth of field based on the image obtaining conditions.
(7) A subject determining section 27 that determines whether the main subject is a subject of a memory color emphasis or not based on the main area and the image obtaining conditions.
(8) A corresponding memory section 28 that memorizes a combination of representative colors of the main area/non-main area and an accrual trend of a color contrast effect accrues at the main area resulting from the combination as a correspondence relation. This correspondence relation is prepared in advance by a psychological experiment and so on of the color contrast effect.

<Operations of Image Processing Apparatus 13>

Figure 2:
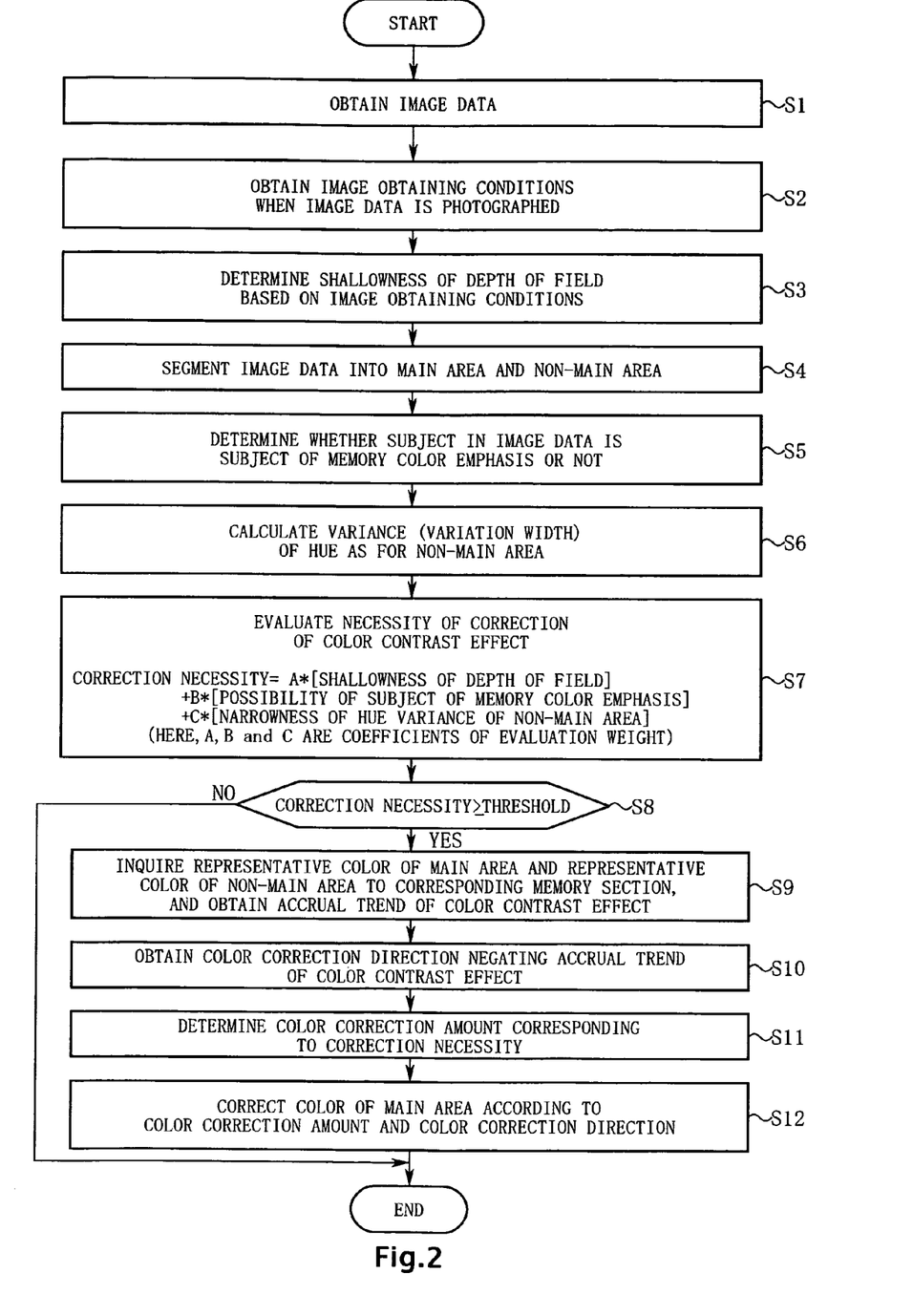
FIG. 2 is a flowchart explaining operations of an image processing apparatus 13.

FIG. 2 is a flowchart explaining operations of the image processing apparatus 13. Hereinafter, these process operations are described along step numbers shown in FIG. 2.

Step S1: The image input section 21 loads the image data output from the imaging section 12, and stores on an internal memory.

Step S2: The information obtaining section 25 obtains the image obtaining conditions when the image data is photographed. For example, the information obtaining section 25 obtains the image obtaining conditions from the imaging control section 15 and so on.

Step S3: The condition determining section 26 determines the depth of field at the time of photographing based on the image obtaining conditions of the image data.

Figure 3:
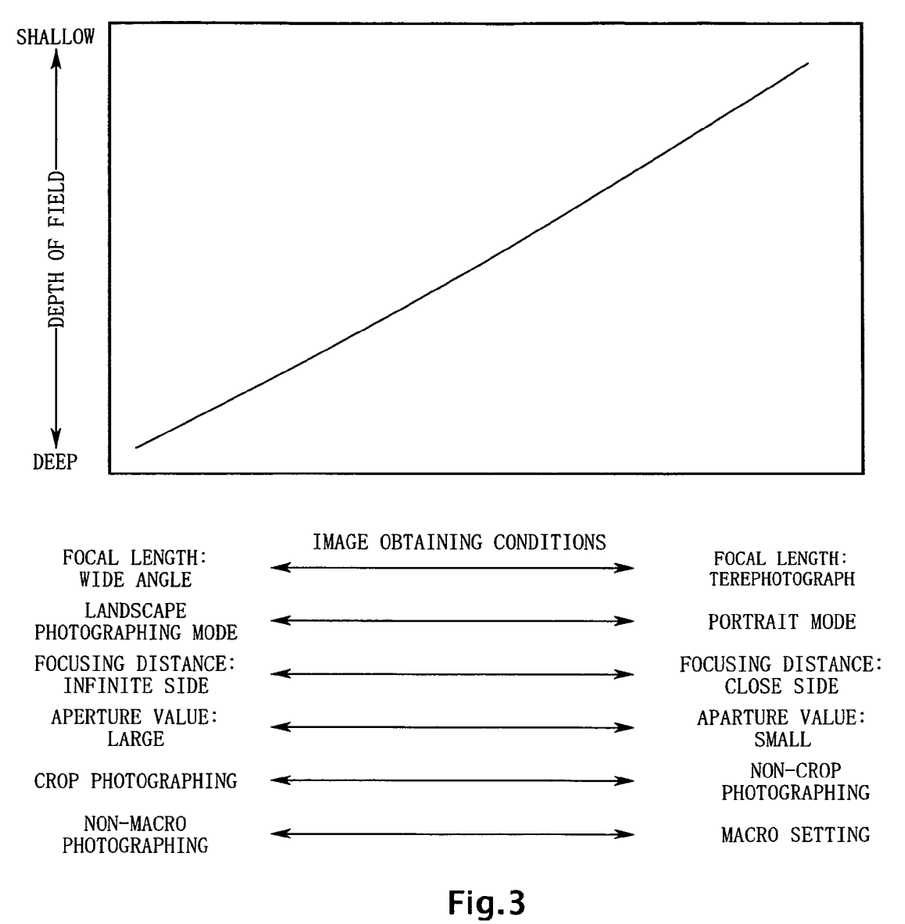
FIG. 3 is a view illustrating a determination example of a depth of field.

FIG. 3 is a view illustrating a determination example of the depth of field. Here, the depth of field is determined to be shallower as the image obtaining conditions satisfy more of the conditions stated below.
(Condition 1) A focal length of a lens at the time of photographing is a telephoto area.
(Condition 2) An exposure setting is for a portrait.
(Condition 3) A focusing distance of the lens is a close area.
(Condition 4) An aperture value at the time of photographing is small.
(Condition 5) An imaging screen size of the image pickup device is large (non-crop photographing and so on).
(Condition 6) A focusing range of the lens is a macro area.

Step S4: The image segmenting section 22 segments the image data into the main area containing the main subject and the non-main area other than the main area.

For example, the image segmenting section 22 performs well-known face recognition processes (such as a flesh color recognition, a contour recognition of a face, or a form recognition of eyes, nose, mouth, ears and so on), and detects a face position and a face size in the image data. The image segmenting section 22 can segments the image data into the main area containing a face area or a body area, and the non-main area other than the main area based on the process result of this face recognition.

Besides, for example, the image segmenting section 22 obtains a position of a focus detecting area (a focusing area) which is in a focus state at the time of photographing. The image segmenting section 22 can segments the image data into the main area containing the subject image at the focusing area and the non-main area other than the main area based on the detected result.

Besides, for example, the image segmenting section 22 detects a high contrast area and a high-pass spatial frequency area from the image data. It is possible to segments the image data into the main area containing the high contrast area or the high-pass spatial frequency area and the non-main area other than the main area based on the detected result.

Besides, for example, the image segmenting section 22 detects a contour place from the image data. It is possible to segments the image data into the main area surrounded by the contour place and the non-main area other than the main area based on the detected result.

Step S5: The subject determining section 27 determines whether the subject photographed on the image data is the subject of the memory color emphasis or not based on the image obtaining conditions and the representative color of the image data.

Figure 4:
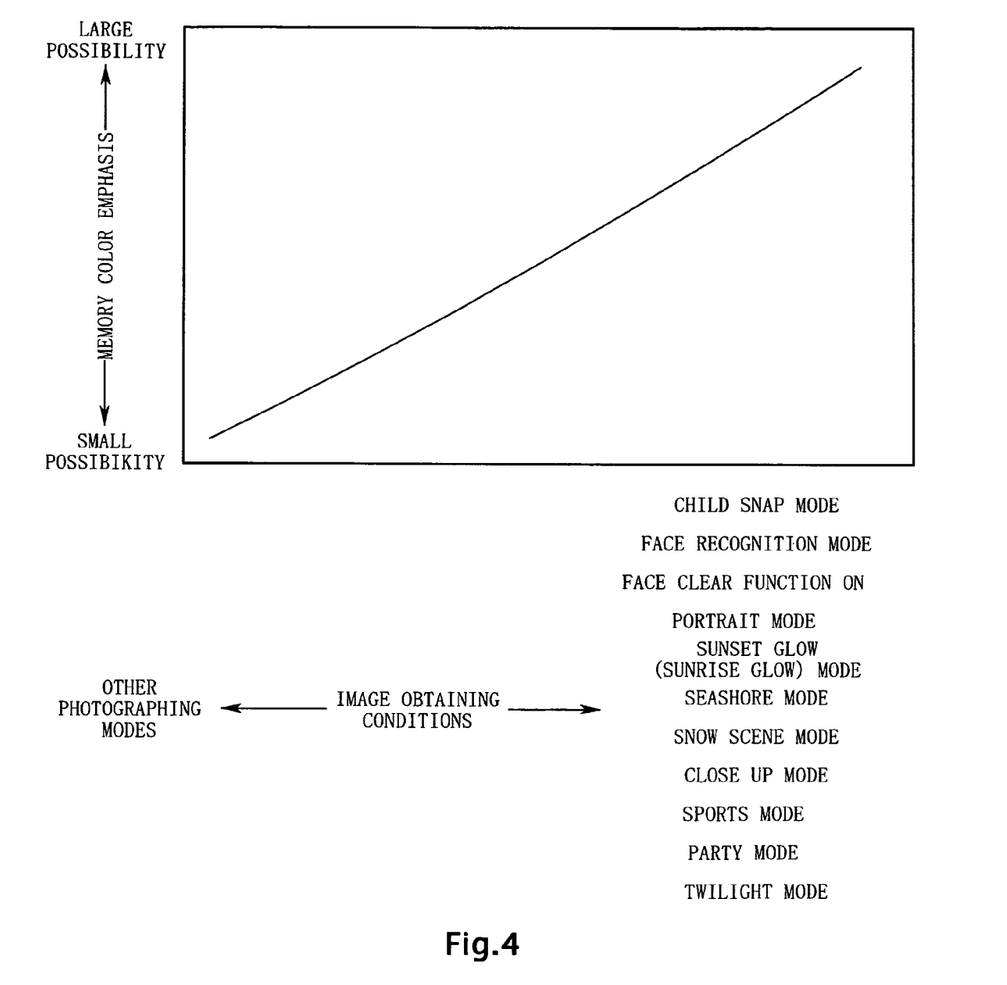
FIG. 4 is a view explaining a relation between image obtaining conditions and a memory color emphasis.

FIG. 4 is a view explaining a relation between the image obtaining conditions and the memory color emphasis. In this example, a photographing mode of the imaging section 12 when the image data is photographed is noticed. The subject determining section 27 determines that a degree of the memory color emphasis is high when the photographing mode is a photographing mode in which a photographic subject and a photographic intention are distinct such as a child snap mode.

Incidentally, a user questionnaire may be performed in advance questioning whether the memory color is to be emphasized or not in the photographing by each of plural kinds of photographing modes. In this case, it is possible to score the degree of the memory color emphasis by each photographing mode according to the questionnaire result.

Besides, for example, the degree of the memory color emphasis may be determined to be high when the representative color of the image data is the memory color such as the flesh color, a blue sky color.

Figure 5:
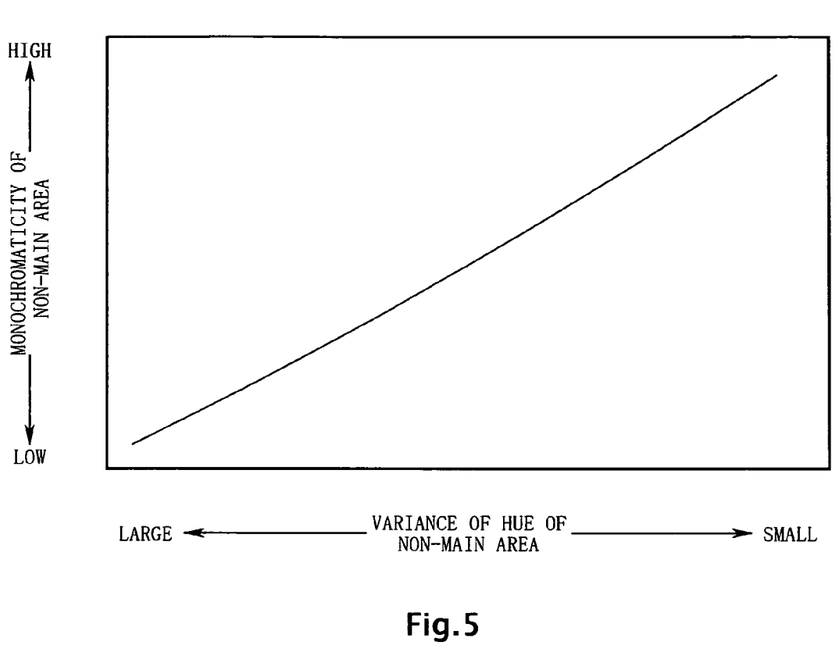
FIG. 5 is a view explaining a relation between a variance of hue and a monochromaticity.

Step S6: The determining section 24 calculates the variance of hue (a mean square of a variation width of the hue and so on) for the non-main area segmented at the step S4. As illustrated in FIG. 5, it is possible to determine that the non-main area is close to similar colors as the variance of hue is narrower.

Step S7: The correcting section 23 obtains a necessity of a correction of the color contrast effect based on at least one of the above-stated (1) a shallowness of the depth of field, (2) a possibility of the subject of the memory color emphasis, and (3) a narrowness of the hue variance of the non-main area.

For example, the shallower the depth of field is, the simpler a color arrangement becomes because the non-main area comes close to the similar colors, and therefore, it can be estimated that a psychological effect of the color contrast is emphasized. Consequently, it is possible to determine that the necessity of the color correction of the main area is high as the depth of field is shallower.

Besides, for example, it is possible to determine that the necessity of the color correction of the main area is high as the possibility of the subject of the memory color emphasis is higher because unnaturalness of the color contrast effect stands out.

Besides, for example, the narrower the variance of hue of the non-main area is, the simpler the color arrangement becomes because the non-main area comes close to the similar colors, and therefore, it can be estimated that the psychological effect of the color contrast is emphasized. Consequently, it is possible to determine that the necessity of the color correction of the main area is high as the variance of hue of the non-main area is narrower.

Incidentally, the correction necessity of the color contrast effect may be comprehensively determined based on an expression stated below.

Correction necessity=$A$×[the shallowness of the depth of field]

+$B$×[the possibility of the subject of the memory color emphasis]

+$C$×[the narrowness of the variance of hue of the non-main area]

Here, "A", "B" and "C" are coefficients of an evaluation weight. A weight distribution of these coefficients is preferable to be experimentally adjusted based on a priority of each item reflected to the correction necessity.

Step S8: The correcting section 23 determines whether the correction necessity obtained at the step S7 is equal to a threshold or more or not. The threshold stated here is a threshold to determine whether the color contrast effect reduces the color reproducibility or not, and it is preferable to be defined in advance based on the user questionnaire and so on.

Here, when the correction necessity is less than the threshold, the correcting section 23 completes a process routine without performing the color correction of the main area.

On the other hand, when the correction necessity is equal to the threshold or more, the correcting section 23 transfers the operation to step S9 to perform the color correction of the main area.

Step S9: The correcting section 23 respectively obtains the representative colors for the main area and the non-main area obtained at the step S4.

For example, a color appearing at the area with the maximum frequency may be obtained as the representative color. Besides, for example, colors appearing at the area are extracted to be averaged, and the average color may be regarded as the representative color. Besides, for example, an outstanding color with high chroma saturation and high frequency is sorted out from the area, and the color may be regarded as the representative color.

The correcting section 23 inquires the combination between the representative color of the main area and the representative color of the non-main area to the corresponding memory section 28, and obtains the accrual trend of the color contrast effect accrued at the main area.

Figure 6:
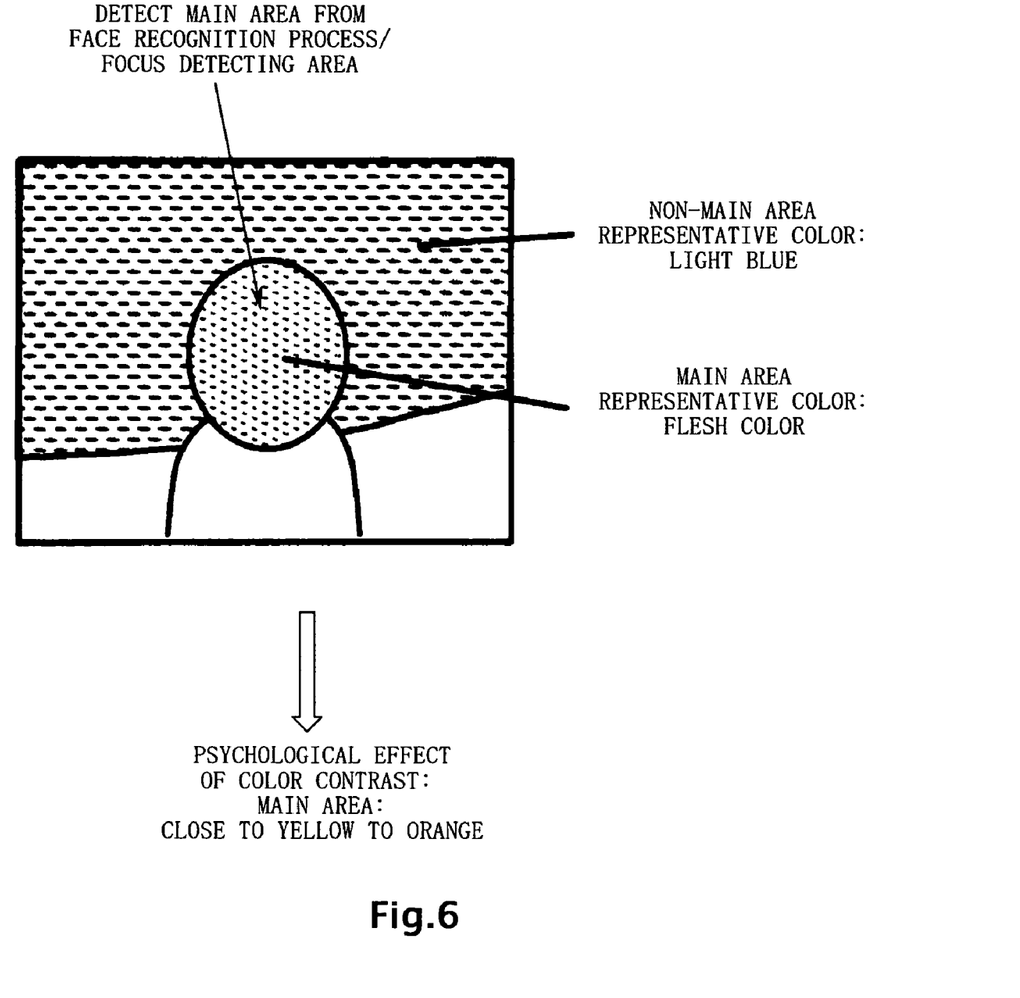
FIG. 6 is a view explaining an accrual example of a color contrast effect.
Figure 7:
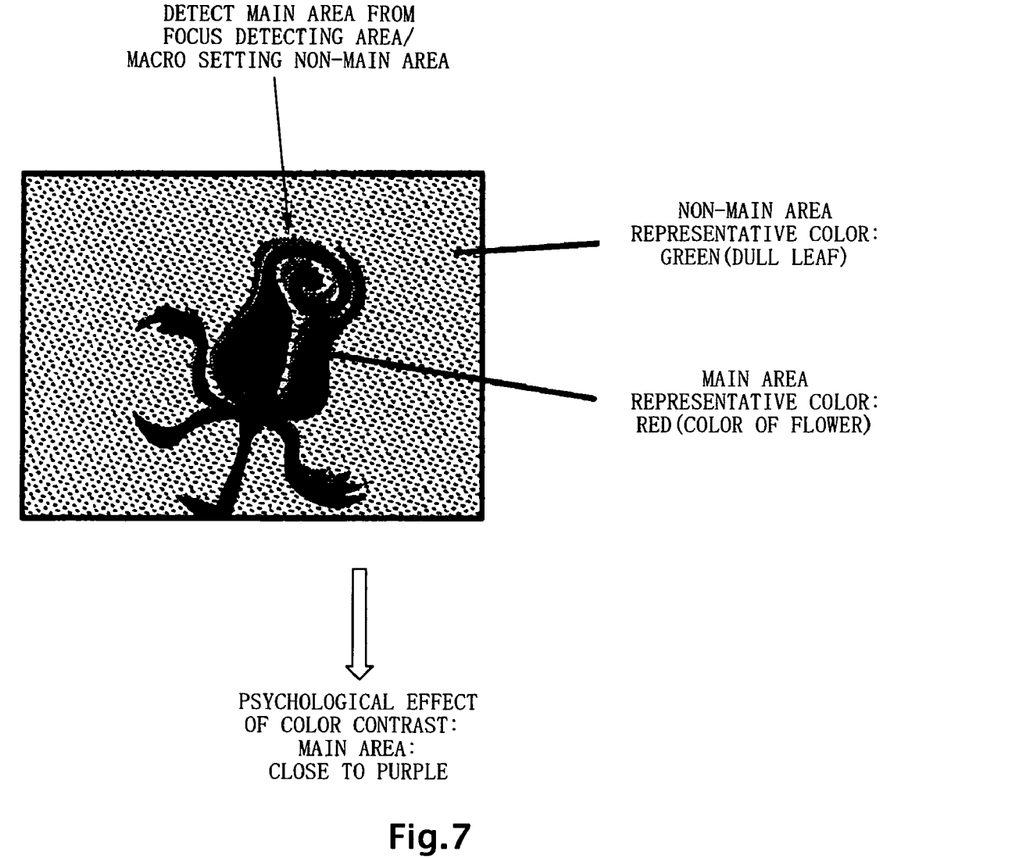
FIG. 7 is a view explaining the accrual example of the color contrast effect.

FIG. 6 and FIG. 7 are views illustrating accrual examples of this color contrast effect. In FIG. 6, a case is illustrated when the representative color of the main area is the flesh color and the representative color of the non-main area is the blue sky color. In this case, the flesh color of the main area seems to be shifted in yellow to orange directions. In FIG. 7, a case is illustrated when the representative color of the main area is red and the representative color of the non-main area is green. In this case, the red of the main area seems to be shifted in a purple direction.

Step S10: The correcting section 23 obtains a color correction direction to negate the accrual trend of the color contrast effect obtained at the step S9.

Figure 8:
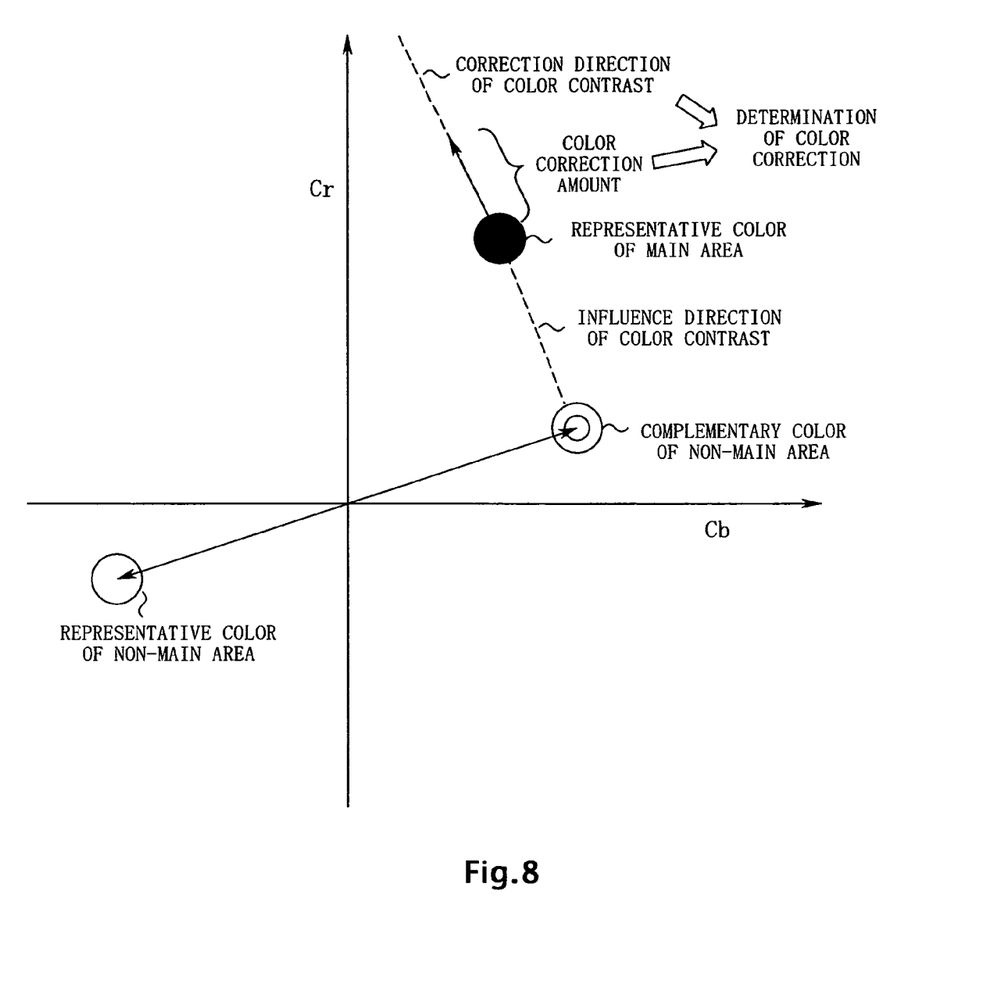
FIG. 8 is a view explaining a color correction direction and a color correction amount.

FIG. 8 is a view explaining this color correction direction. In FIG. 8, a horizontal axis is an axis of a color difference component Cb, and a vertical axis is an axis of a color difference component Cr. A white circle shown in FIG. 8 is the representative color of the non-main area. A double circle shown in FIG. 8 illustrates a complementary color (strictly, a psychological complementary color) of the non-main area. It seems that the representative color of the main area (a black circle in FIG. 8) is covered with a transmission veil of this complementary color. Accordingly, the hue of the main area is corrected in a direction getting away from this complementary color, and thereby, the accrual trend of the contrast effect of hue can be negated.

Incidentally, the color contrast effect also affects chroma of the main area. Namely, the higher the chroma of the non-main area becomes, the duller the chroma of the main area seems. Accordingly, when the chroma of the representative color of the non-main area is high, the chroma of the main area is adjusted in a direction enhanced relatively, and thereby, the accrual trend of the contrast effect of the chroma can be negated.

Besides, the color contrast effect also affects lightness of the main area. Namely, the higher the lightness of the non-main area is, the lower the lightness of the main area seems. Accordingly, when the lightness of the representative color of the non-main area is high, the lightness of the main area is adjusted in a direction enhanced relatively, and thereby, the accrual trend of the contrast effect of the lightness can be negated.

Step S11: The correcting section 23 sets a color correction amount while adjusting the degree of the color correction to be stronger as the correction necessity obtained at the step S7 is higher. It is preferable that naturalness of the color after correction is experimentally set as an evaluation criteria as for a relation between the correction necessity and a strong and weak degree of the color correction.

Step S12: A correction process of color is determined as illustrated in FIG. 8 by the color correction direction defined at the step S10 and the color correction amount defined at the step S11. The color of the main area is corrected according to the correction process.

The image data completing the above-stated series of processes is recorded on a not-shown recording medium by the recording section 14 after passing through other image processes.

Effects of Embodiment and so on

In the present embodiment, the variance of hue of the non-main area or the shallowness of the depth of field is determined. It can be determined that the non-main area is close to the similar colors as the variance of hue of the non-main area is smaller. Besides, the shallower the depth of field is, the closer the non-main area becomes close to the similar colors because it becomes largely out of focus and colors are mixed.

As stated above, it is often the case that at least the non-main area falls within a range of the similar colors, though it does not become an excessive solid image. The closer the non-main area comes to the similar colors as stated above, the simpler a color relation of the image data becomes, and the stronger the psychological effect of the color contrast becomes.

The present embodiment can practically estimate the strong and weak of the color contrast effect based on the hue variance of the non-main area or the depth of field as stated above. Further, it is possible to appropriately control the color correction of the main area based on the estimated result.

In particular, in the present embodiment, the strong and weak of the color contrast effect is practically estimated by the variance of hue of the non-main area. The strong and weak of the color correction are changed in accordance with the estimated result, and thereby, it becomes possible to suppress the color contrast effect appropriately, and to obtain a visually-natural color reproducibility.

Besides, in the present embodiment, the strong and weak of the color contrast effect is practically estimated by determining the shallowness of the depth of field from the image obtaining conditions. It becomes possible to appropriately control the strong and weak of the color correction also by this estimated result. As a result, it becomes possible to obtain the visually-natural color reproducibility.

Further, in the present embodiment, the strong and weak of the color contrast effect are roughly estimated from the image obtaining conditions. In this case, it becomes possible to estimate the color contrast effect easily and rapidly without performing a complicated image analysis.

Supplementary Items of the Embodiments

Incidentally, in the above-stated embodiment, a case in which the image processing apparatus 13 is mounted on the imaging apparatus 11 is described, but for example, it is possible to realize the image processing apparatus of the present embodiment in software-wise, by using a computer and an image processing program (in which operations in FIG. 2 are program coded).

Incidentally, in this case, it is preferable to obtain the image obtaining conditions from information associated with the image data (Exif information and so on).

Besides, in the above-stated embodiment, an example in which the image processing apparatus 13 performs the correction of the color contrast effect for the main area is described. However, the color contrast effect is a relative effect, and therefore, the image processing apparatus 13 may perform the correction of the color contrast effect for the non-main area.

For example, when it is judged that the variance is small or the depth of field is shallow, the image processing apparatus 13 may correct the color of the non-main area in a direction negating an influence of the color contrast effect. At this time, the image processing apparatus 13 sets which area is to be corrected either of the main area or the non-main area based on, for example, the following criteria.

As an example, in a case when the correction is performed when the subject is judged to be the memory color emphasis, the image processing apparatus 13 may emphasize the color reproduction of an output flesh color, and may correct the hue, chroma and lightness at the non-main area (background) side under a case when the subject is a human (flesh color) which is judged as a main subject, and the image processing apparatus 13 performs an optimized output of the flesh color as the memory color.

As an example, when the correction is performed when the subject is judged to be the memory color emphasis, the image processing apparatus 13 may similarly correct the hue, chroma and lightness at the main area (main subject) side under a case when a subject being emphasized and optimizedly displayed is sky, and the subject is judged as the non-main area (background).

As an example, the image processing apparatus 13 may reduce the chroma at the non-main area side when the background seems vivid and the main subject seems dull caused by a contrast effect of the chroma, and when the chroma of the main subject is already sufficiently high and a color saturation may occur in the main subject by making the chroma higher.

As an example, the image processing apparatus 13 may reduce the lightness at the non-main area side when the background is bright and the lightness of the main subject seems to be low caused by a contrast effect of the lightness, and when the main subject is already sufficiently bright and an overexposure may occur in the main subject by making the lightness higher.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
an image input section loading an input image data;
an image segmenting section segmenting said image data into a main area containing an image of a main subject and a non-main area other than the main area;
a correcting section correcting a color of said main area based on a color of said non-main area; and
a determining section determining a variance of hue of said non-main area,
wherein said correcting section enhances the correction of the color of said main area when said variance is small compared to a case when said variance is large.

2. An image processing apparatus, comprising:
an image input section loading an input image data;
an image segmenting section segmenting said image data into a main area containing an image of a main subject and a non-main area other than the main area;
a correcting section correcting a color of said main area based on a color of said non-main area;

an information obtaining section obtaining image obtaining conditions at a time of photographing of said image data as information; and a condition determining section determining whether said image data is photographed under a photographing state in which a depth of field is shallow or not based on said image obtaining conditions, wherein said correcting section enhances the correction of the color of said main area when said depth of field is shallow compared to a case when said depth of field is deep.

3. The image processing apparatus according to claim 1, further comprising:

a corresponding memory section memorizing a combination of the colors of said main area and said non-main area and an accrual trend of a color contrast effect accrued at said main area, as a correspondence relation beforehand, wherein said correcting section inquires the combination of the colors of said main area and said non-main area to said corresponding memory section, determines the accrual trend of said color contrast effect, and corrects the color of said main area in a direction in which the accrual trend of said color contrast effect is negated.

4. The image processing apparatus according to claim 2, further comprising:

a corresponding memory section memorizing a combination of the colors of said main area and said non-main area and an accrual trend of a color contrast effect accrued at said main area, as a correspondence relation beforehand, wherein said correcting section inquires the combination of the colors of said main area and said non-main area to said corresponding memory section, determines the accrual trend of said color contrast effect, and corrects the color of said main area in a direction in which the accrual trend of said color contrast effect is negated.

5. An imaging apparatus, comprising:
an image processing apparatus according to claim 1; and
an imaging section photographing a subject and generating an image data,
wherein said image processing apparatus corrects a color of said image data generated at said imaging section.

6. An imaging apparatus, comprising:
an image processing apparatus according to claim 2; and
an imaging section photographing a subject and generating an image data,
wherein said image processing apparatus corrects a color of said image data generated at said imaging section.

7. An imaging apparatus, comprising:
an image processing apparatus according to claim 3; and
an imaging section photographing a subject and generating an image data,
wherein said image processing apparatus corrects a color of said image data generated at said imaging section.

8. An imaging apparatus, comprising:
an image processing apparatus according to claim 4; and
an imaging section photographing a subject and generating an image data,
wherein said image processing apparatus corrects a color of said image data generated at said imaging section.

9. A non-transitory computer-readable medium storing an image processing program that causes a computer to function as an image processing apparatus according to claim 1.

10. A non-transitory computer-readable medium storing an image processing program that causes a computer to function as an image processing apparatus according to claim 2.

11. A non-transitory computer-readable medium storing an image processing program that causes a computer to function as an image processing apparatus according to claim 3.

12. A non-transitory computer-readable medium storing an image processing program that causes a computer to function as an image processing apparatus according to claim 4.

* * * * *